(12) United States Patent
Takada (10) Patent No.: US 8,199,907 B2
(45) Date of Patent: Jun. 12, 2012

(54) ECHO CANCELLER AND ECHO CANCELLING METHOD AND PROGRAM

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 526 days.

(21) Appl. No.: 12/461,285

(22) Filed: Aug. 6, 2009

(65) Prior Publication Data

US 2010/0086122 A1   Apr. 8, 2010

(30) Foreign Application Priority Data

Oct. 2, 2008   (JP) ................... 2008-257589

(51) Int. Cl.
  *H04M 1/00*   (2006.01)
(52) U.S. Cl. .............. 379/406.08; 379/406.09
(58) Field of Classification Search .............. 379/3, 406.01–406.09
See application file for complete search history.

(56) References Cited

U.S. PATENT DOCUMENTS

2009/0074177 A1*   3/2009   Takada ............. 379/406.01

FOREIGN PATENT DOCUMENTS

| JP | 08-237174 | 9/1996 |
|---|---|---|
| JP | 2009-118139 | 5/2009 |

OTHER PUBLICATIONS

Haykin, *Tekio firuta nyumon* (Japanese translation of *Introduction to Adaptive Filters*), pp. 148-159, Gendaikogakusha, Sep. 1987.
U.S. Appl. No. 12/320,975, filed Sep. 17, 2009, Oki Electric Industry Co., Ltd.

* cited by examiner

*Primary Examiner* — Creighton Smith
(74) *Attorney, Agent, or Firm* — Rabin & Berdo, P.C.

(57) ABSTRACT

An echo canceler uses an adaptive filter to remove an echo of a far-end input signal from a near-end input signal. Filter coefficients are calculated and updated while the far-end signal is active. While the far-end signal is silent, substitute filter coefficients are similarly calculated to be swapped in as initial values for the filter coefficients when the far-end signal changes from silent to active. The substitute filter coefficients are generated from a simulated far-end signal and a simulated near-end signal obtained by combining corresponding samples in different intervals of the far-end and near-end input signals. To facilitate convergence of the substitute filter coefficients, use of the simulated far-end and near-end signals is disabled when the corresponding samples cancel out.

19 Claims, 7 Drawing Sheets

| v_flg | steals_adapt_go | ADF_N6 | ADF_S17 |
|---|---|---|---|
| 0 | 0 | NO ADAPTATION | NO OPERATION |
| 1 | 0 | ADAPTATION | NO ADAPTATION |
| 0 | 1 | NO ADAPTATION | ADAPTATION |
| 1 | 1 | ADAPTATION | NO ADAPTATION, steals_adapt_go RESET TO ZERO |

FIG.7

ECHO CANCELLER AND ECHO CANCELLING METHOD AND PROGRAM

BACKGROUND OF THE INVENTION

1. Field of the Invention

The present invention relates to an echo canceler and an echo canceling method and program that are, applicable to, for example, a hands-free telephone terminal.

2. Description of the Related Art

With the recent proliferation of voice over Internet protocol (VoIP) telephony, telephone rates have come down and people can make telephone calls from their homes and offices with reduced concern about telephone bills. As a result, in many cases the calls last longer. This has led to a sudden rise in the demand for hands-free telephone sets as a means of avoiding the discomfort caused by holding a telephone receiver pressed against the ear for an extended period of time.

The simplest types of hands-free telephone sets employ earphones or headsets, but earphones rub against the ear canal and cause painful inflammation, while headsets cause irritation and fatigue if worn for a long time. Headsets are often used at call centers to enable an operator to operate a personal computer while dealing with calls from customers, but headsets are not suitable for general use in the home, where the user simply wants to be able hold extended telephone conversations without physical stress or discomfort. The most popular type of hands-free telephone set is therefore the speakerphone, which employs a loudspeaker instead of an earphone or headsets.

An essential part of a speakerphone is an acoustic echo canceler that removes the echo of the acoustic output of the loudspeaker from the signal input through the microphone. An essential part of an acoustic echo canceler is its adaptive filter, which has tap coefficients that mimic the effect of the acoustic echo path. A key part of the adaptive filter is the algorithm used to update the tap coefficients for optimum echo cancellation.

Many acoustic echo cancelers employ the normalized least mean squares (NLMS) algorithm, described by Haykin in *Introduction to Adaptive Filters* (Macmillan, June 1984 (Japanese translation published by Gendaikogakusha, September 1987). The NLMS algorithm has the advantage of excellent stability, which offsets its disadvantage of relatively slow convergence for so-called 'colored signals' with a non-flat frequency spectrum. Voice signals are typically colored in this sense.

Although the NLMS algorithm remains an excellent choice for some purposes, the spread of VoIP has led to the introduction of wideband telephony, which provides better speech quality than conventional telephony. In wideband telephony, the sampling rate of the speech signal is typically doubled from eight thousand samples per second (8 kHz) to sixteen thousand samples per second (16 kHz). As a result, the number of filter taps is also doubled, causing the NLMS algorithm to converge even more slowly. Haykin also describes a computationally more advanced recursive least squares (RLS) algorithm that converges faster than the NLMS algorithm, but besides requiring extensive computation and vast amounts of memory, the RLS algorithm lacks the stability of the NLMS algorithm. Since the RLS algorithm is expensive to implement and fails to provide stable voice quality, it is unsuitable for general use in telephone sets in the home.

In Japanese Patent Application Publication No. 08-237174, Igai discloses a method of overcoming these problems by continuous optimization of the step gain in the NLMS algorithm. A large initial step gain is employed, so that the algorithm starts by converging quickly. As convergence progresses, the step gain is reduced so that the algorithm can model the echo accurately under steady-state conditions.

Continuous optimization of the step gain, however, fails to solve the problem of poor convergence for colored signals, and introduces new problems. For example, if voice input is preceded by a call control tone, and if the algorithm converges while the call control tone is being received, then the reduced step size delays adaptation to the echo characteristics of the voice signal.

In Japanese Patent Applications No. 2007-288404 and 2008-063086, filed by the present applicant, an attempt is made to solve these problems by providing an echo canceler that uses the stable NLMS algorithm to update the tap coefficients, but also stores received signal data and echo data as vector data and uses averaged vector data to carry out a simulated convergence process while the far-end party in the telephone conversation is silent, when the operation of the NLMS algorithm is conventionally suspended.

Although this strategy can boost convergence speed by allowing convergence to continue with simulated data, the inherent periodicity of the far-end speech signal can cause the averaged far-end vector data to cancel out. Because of this type of self-cancellation, adequate echo canceling performance is not always obtained.

SUMMARY OF THE INVENTION

An object of the present invention is to improve echo cancellation performance by simulation, using a comparatively simple and stable algorithm that is immune to self-cancellation effects.

The invention provides an echo canceler for removing an echo of a far-end input signal from a near-end input signal by adaptive filtering. The echo canceler includes a voice detector that detects active and silent states of the far-end input signal, a first adaptive filter that filters the far-end input signal by using first coefficients and adapts the first coefficients according to the far-end input signal and the near-end input signal when the voice detector detects the active state, and a second adaptive filter that filters a simulated far-end input signal by using second coefficients and adapts the second coefficients according to the simulated far-end input signal and a simulated near-end input signal when voice detector detects the silent state.

A data selector samples the far-end and near-end input signals simultaneously over periods of a predetermined length, each period including an interval in which the far-end input signal is active, to generate a plurality of processable signals, each including a series of samples. A simulated signal generator generates the simulated far-end and near-end input signals from the processable signals by combining samples in corresponding positions in different processable signals. Both additive and subtractive combining operations may be employed.

A self-cancellation detector decides whether self-cancellation has occurred by deciding whether combining the samples in the corresponding positions has caused the combined samples to cancel each other out, and disables use of at least parts of the simulated far-end signal and the simulated near-end signal for adaptation of the second coefficients when self-cancellation has occurred. Cancellation may be detected on the basis of the vector magnitudes of the simulated far-end input signal and the processable signals from which it is derived.

An adaptive mode controller starts and stops the adaptation of the first and second coefficients. When the adaptation of the first coefficients is started after a period during which the second coefficients were adapted and the first coefficients were not adapted, the second coefficients are used as initial values of the first coefficients.

The simulated far-end and near-end signals enable convergence to continue by simulation even while the far-end signal is silent. Disabling the use of the simulated far-end and near-end signals when self-cancellation occurs prevents the coefficients from diverging during the simulated convergence process due to artifacts of the process that generates the simulated signals.

DETAILED DESCRIPTION OF THE INVENTION

Embodiments of the invention will now be described with reference to the attached drawings, in which like elements are indicated by like reference characters. The embodiments are echo cancelers used as components of a speakerphone. The abbreviations COEFF. (coefficient) and REG. (register) will be used in the drawings. The term 'register' denotes a register file or memory area for storing multiple data or coefficient values.

First Embodiment

Figure 1:
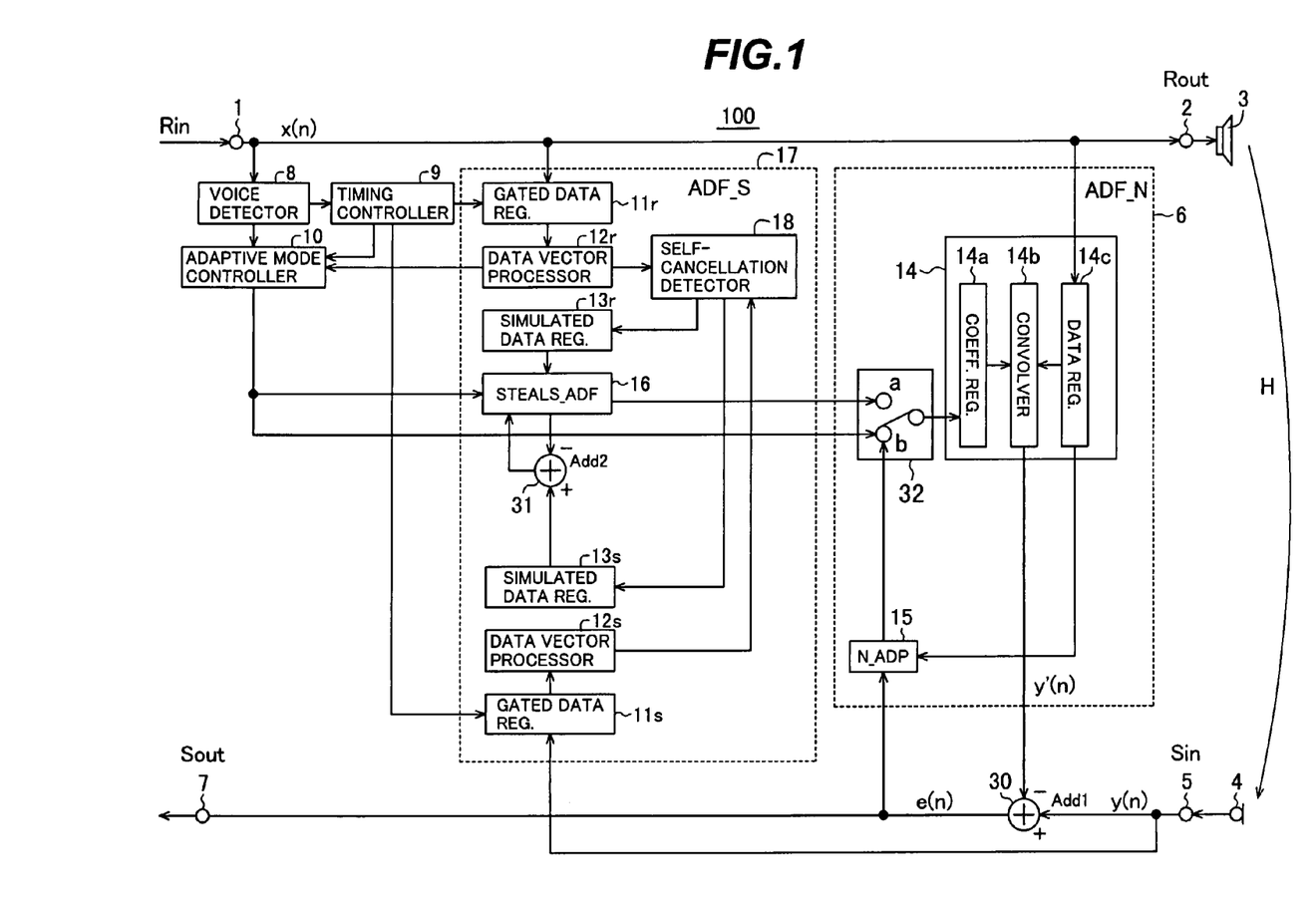
FIG. 1 is a block diagram of an echo canceler according to a first embodiment of the invention.

Referring to the block diagram in FIG. 1, the echo canceler 100 may be implemented as an application-specific integrated circuit using an application-specific processor (ASP). Alternatively, the echo canceler 100 may be implemented as a general-purpose computing device such as a digital signal processor (DSP) or central processing unit (CPU) that executes an echo canceling program with software equivalent to the blocks in FIG. 1.

The echo canceler 100 includes a receiving input terminal Rin 1, a receiving output terminal Rout 2, a sending input terminal Sin 5, and a sending output terminal Sout 7. A voice signal input by a far-end party is routed via the receiving input terminal Rin 1 and the receiving output terminal Rout 2 of the speakerphone to its loudspeaker 3, from which an acoustic signal is output. The output acoustic signal is picked up by the speakerphone's microphone MIC, and is routed toward the far-end party through the sending input terminal Sin 5 and the sending output terminal Sout 7 as an echo. The echo canceler 100 has the function of removing this acoustic echo, leaving only the voice signal input to the speakerphone's microphone 4 by the near-end party, which is also routed through the sending input and output terminals Sin 5 and Sout 7 to the far-end party.

As processing units, the echo canceler 100 includes a normal adaptive filter (ADF_N) 6, a voice detector 8, a timing controller 9, an adaptive mode controller 10, a silent adaptive filter section (ADF_S) 17, and a subtractor 30, shown as an adder with one negative input terminal. The echo canceler 100 also includes a double-talk detector (not shown) that detects periods when the near-end party and far-end party are talking simultaneously; double-talk detectors are well known in the echo canceling art.

The normal adaptive filter 6 comprises an echo replicator 14 having a coefficient register 14a, a convolver 14b, a data register 14c, a normal adapter (N_ADP) 15, and a switch 32 (SW1).

The silent adaptive filter section 17 comprises a pair of gated data registers 11r, 11s that constitute a data selector, a pair of data vector processors 12r, 12s that constitute a simulated signal generator, a pair of simulated data registers 13r, 13s, a silent adaptive filter (STEALS_ADF) 16, a self-cancellation detector 18, and a subtractor 31.

Incidentally, STEALS stands for Silent Time Enhanced Adaptation Loading System.

Figure 2:
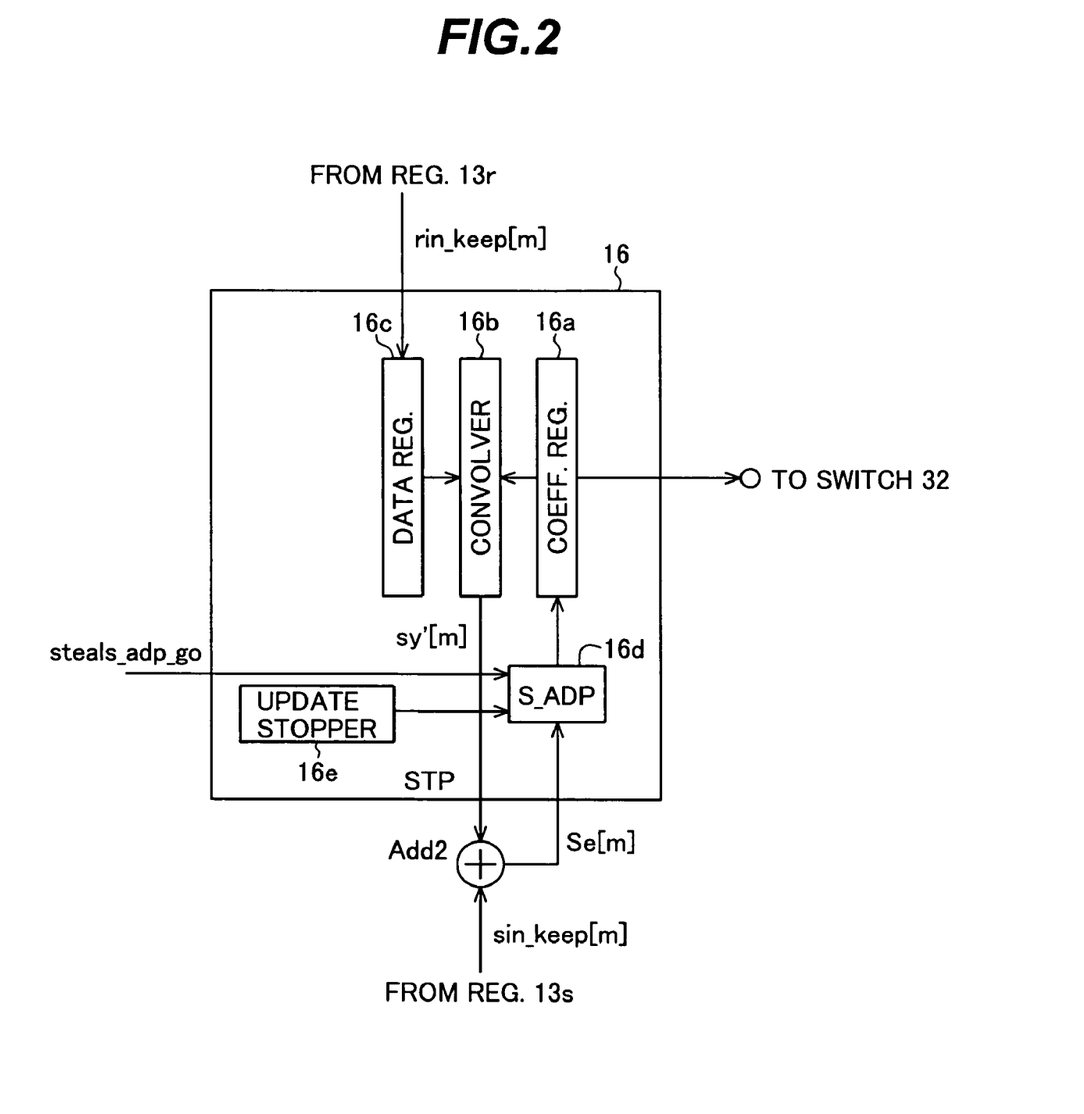
FIG. 2 is a block diagram illustrating the internal structure of the silent adapter in the first embodiment.

Referring to FIG. 2, the silent adaptive filter 16 includes a coefficient register 16a, a convolver 16b, a data register 16c, a silent adaptive filter adapter 16d, and an update stopper 16e.

Figure 3:
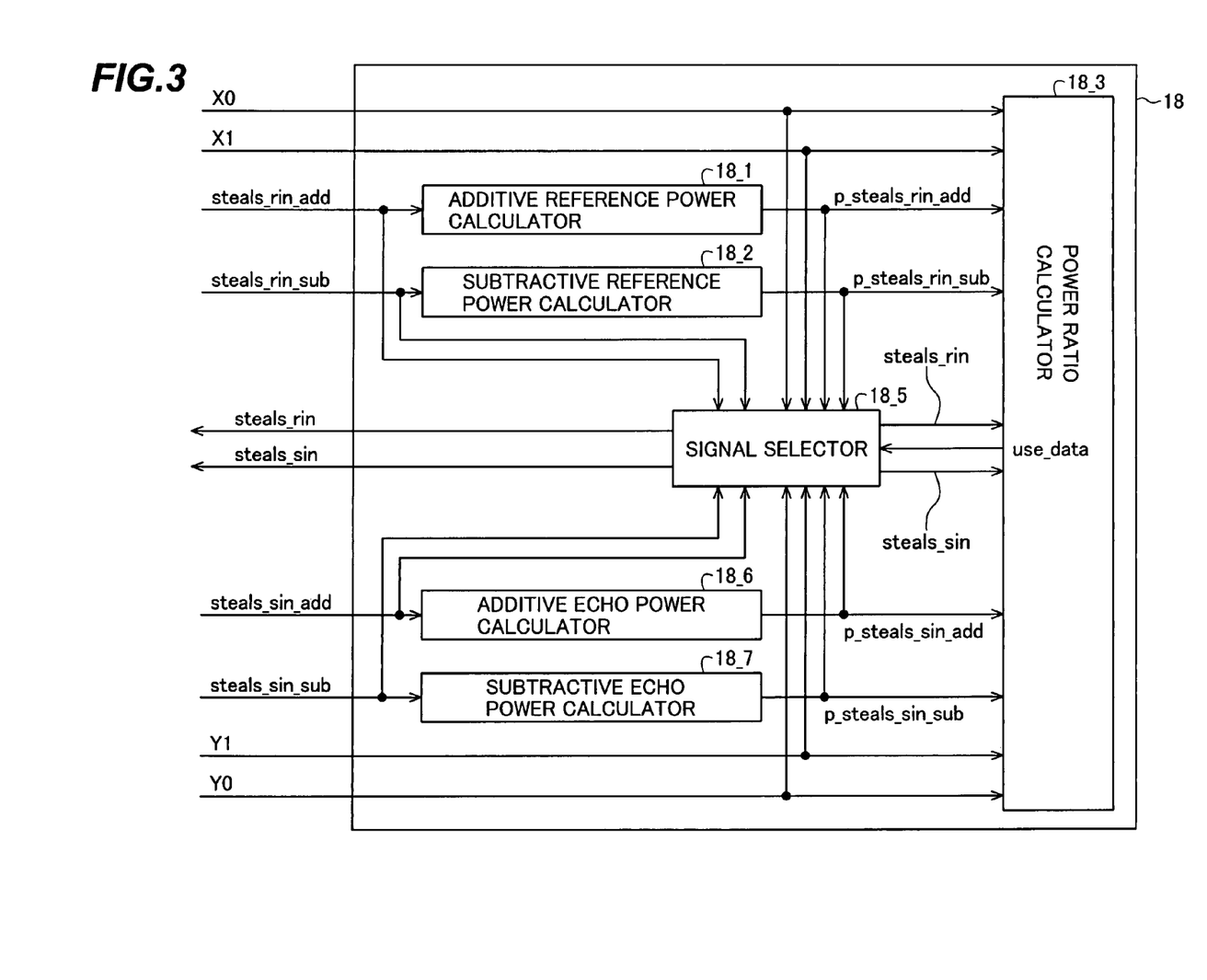
FIG. 3 is a block diagram illustrating the internal structure of the self-cancellation detector in the first embodiment.

Referring to FIG. 3, the self-cancellation detector 18 includes an additive reference power calculator 18_1, a subtractive reference power calculator 18_2, a power ratio calculator 18_3, a signal selector 18_5, an additive echo power calculator 18_7, and a subtractive echo power calculator 18_7.

The functions of the elements of the echo canceler 100 will be explained in the following description of the operation of the echo canceler 100, which is also a description of the echo canceling method employed in the first embodiment.

Referring again to FIG. 1, in the initial state, the adaptive mode controller 10 sets switch 32 so that of its two input terminals, terminal_b is connected to the output terminal, thereby connecting the normal adapter 15 to the coefficient register 14a.

A voice signal x(n) received from a far-end party and converted to a digital signal is routed via the receiving input terminal Rin 1 of the speakerphone to the voice detector 8, the silent adaptive filter section 17, the normal adaptive filter 6, and the receiving output terminal Rout 2. The notation x(n) indicates the nth sample of the voice signal x, where n is an arbitrary integer. The voice signal x(n) output from the receiving output terminal Rout 2 is converted to an analog signal by a digital-to-analog converter (not shown) and the analog signal is output to the loudspeaker 3, which produces audible sound.

The audible sound output from the loudspeaker 3 is heard by the near-end party (not shown) and is also picked up by the microphone 4 and converted to a digital signal by an analog-to-digital converter (not shown). This digital signal is routed to subtractor 30 through the sending input terminal Sin 5. Subtractor 30 receives the input signal from the sending input terminal Sin 5 and subtracts an echo replica signal y'(n) received from the normal adaptive filter 6 to generate a residual signal e(n). The residual signal e(n) is sent from the sending output terminal Sout 7 to the far-end party and is also supplied to the normal adapter 15.

The normal adapter 15 calculates a coefficient vector for use in the normal adaptive filter 6 and supplies the coefficient vector to the coefficient register 14a in the echo replicator 14 through switch 32. The coefficient register 14a stores the coefficients used in the normal adaptive filter 6 as a coefficient vector. The convolver 14b convolves the sample data stored in the data register 14c with the coefficients stored in the coefficient register 14a, by multiplying the data values by the corresponding coefficient values and summing the results. The convolver 14b thereby generates the echo replica signal y'(n), and supplies the echo replica signal y'(n) to subtractor 30.

The voice detector 8 detects the active state and silent state of the far-end voice signal x(n) input from the receiving input terminal Rin 1, and sends a v_flg control signal indicating the active state or the silent state to the timing controller 9 and adaptive mode controller 10. On the basis of the v_flg control signal and a steals_adapt_go control signal received from data vector processor 12r, the adaptive mode controller 10 generates a steals_adp_go control signal that controls the operation of the silent adaptive filter 16, and controls switch 32 in the normal adaptive filter 6 so that the coefficient register 14a in the normal adaptive filter 6 can receive, in place of the coefficients output by the normal adapter 15, substitute coefficients that have been updated in the silent adaptive filter section 17 while the far-end signal was silent.

The internal operation of the normal adaptive filter 6 and the internal operation of the silent adaptive filter section 17 will now be described.

As noted above, the voice detector 8 detects the active state and silent state of the far-end digital voice signal x(n) received at the receiving input terminal Rin 1, and sends a v_flg control signal indicating the active state or the silent state to the timing controller 9 and adaptive mode controller 10. The active and silent states may be detected by taking the difference between a long-term average and a short-term average of the signal power. For example, if LPO_L is the long-term average power calculated over an interval of five seconds and LPO_S is the short-term average power calculated over an interval of thirty milliseconds, the active state may be detected when the following condition is satisfied, where VD_δ is a predetermined detection margin such as six decibels (6 dB).

$$LPO\_S \geq LPO\_L + VD\_\delta \quad (1)$$

When this condition is not satisfied, the silent state is detected.

The invention is not limited to this particular method of detecting the active state and silent state.

The v_flg control signal is a bi-level signal with values of one (v_flg=1) designating the active state and zero (v_flg=0) designating the silent state.

When the v_flg control signal from the voice detector 8 is asserted (v_flg=1), the adaptive mode controller 10 deactivates the steals_adp_go control signal (steals_adp_go=0) to halt the operation of the silent adaptive filter adapter 16d in the silent adaptive filter section 17, and selects terminal_b in switch 32. When the v_flg control signal is inactive (v_flg=0), the adaptive mode controller 10 selects terminal_a in switch 32. From the v_flg control signal received from the voice detector 8, the timing controller 9 generates a KEEP signal, which is supplied to the adaptive mode controller 10 and the gated data registers 11r, 11s to control the collection of samples of the near-end and far-end signals. The timing controller 9 asserts the KEEP signal for a certain period starting each time the v_flg control signal changes from zero to one (each transition from v_flg=0 to v_flg=1). When the v_flg control signal is asserted (v_flg=1), the silent adaptive filter section 17 has no effect on the normal adaptive filter 6 and its related components, including the voice detector 8, the adaptive mode controller 10, the receiving input terminal Rin 1, the receiving output terminal Rout 2, the sending input terminal Sin 5, the sending output terminal Sout 7, the loudspeaker 3, and the microphone 4.

When the v_flg control signal is asserted (v_flg=1) and the adaptive mode controller 10 selects terminal_b in switch 32, the normal adaptive filter 6 operates as described below. First, N consecutive samples of the far-end input signal x(n) received at the receiving input terminal Rin 1 are stored in data register 14c. The stored samples may be treated as a data vector X(n) expressed by the following equation (2).

$$X(n) = [x(n), x(n-1), \ldots, x(n-N+1)]^t \quad (2)$$

The letter n is the sample number, N is the tap length (e.g., 1024 in the first embodiment), and the superscript t denotes transposition. Accordingly, X(n) is a column vector of the N most recently received far-end signal samples up to and including time n.

X(n) will also be denoted Xn where convenient below. Similarly, near-end data vectors will be denoted interchangeably as Y(n) and Yn.

The coefficient register 14a stores N tap coefficients (not shown). The normal adapter 15 constantly updates the N coefficient values. The N tap coefficients stored in the coefficient register 14a may be treated as a coefficient vector H(n) expressed by the following equation (3).

$$H(n) = [h(0), h(1), \ldots, h(N-1)]^t \quad (3)$$

Convolver 14b receives the coefficient vector H(n) stored in the coefficient register 14a and the data vector X(n) stored in data register 14c, and calculates the single-valued scalar product y'(n) of the coefficient vector H(n) and the data vector X(n) expressed by the following equation (4). The scalar product y'(n) is the echo replica signal y'(n), which is sent to subtractor 30.

$$y'(n) = H^t(n) X(n) \quad (4)$$

Subtractor 30 subtracts the echo replica signal y'(n) from the echo y(n) picked up by the microphone 4 to generate the residual signal e(n), expressed by the following equation (5), which is sent to the sending output terminal Sout 7. From the sending output terminal Sout 7, the residual signal e(n) is transmitted to the far-end party (not shown).

$$e(n) = y(n) - y'(n) \quad (5)$$

Subtractor 1 also sends the residual signal e(n) to the normal adapter 15. The normal adapter 15 uses the NLMS algorithm expressed by the following equation (6), for example, to calculate new tap coefficients for use in the normal adaptive filter 6, and updates the coefficient values. The symbol x(n) in equation (6) denotes the sample data stored in data register 14c.

$$H(n+1) = H(n) + \alpha \frac{X(n) e(n)}{\sum_{i=0}^{N-1} x^2(n-i)} \quad (6)$$

The normal adapter 15 sends the updated coefficient vector H(n+1) to coefficient register 14a via switch 32 for use in generating the next echo replica signal y'(n+1). Over repeated updates, normally the absolute value of the residual signal e(n) in equation (5) gradually diminishes to the point where the update computation in equation (6) leaves the coefficient vector substantially unchanged. This state is described by saying that the normal adaptive filter 6 has converged. The normal adaptive filter 6 can then accurately cancel the echo y(n), and continues to do so as long as the v_flg control signal from the voice detector 8 remains active (v_flg=1).

Next, the operation of the silent adaptive filter section 17 will be described.

The silent adaptive filter section 17 gathers near-end and far-end signal data and simulates the operation of the normal adaptive filter 6 while the far-end signal is silent (v_flg=0) and the normal adaptive filter 6 is halted, thereby generating coefficient data adapted to the echo path H. The generated coefficient data are supplied through switch 32 to the echo replicator 14.

When the voice detector 8 detects a transition from the silent to the active state of the far-end digital voice signal x(n) and asserts the v_flg control signal (v_flg=1), the timing controller 9 asserts a KEEP signal for a predetermined period. While the KEEP signal is active, gated data register 11r collects and temporarily stores samples of the far-end signal x(n), and gated data register 11s collects and temporarily stores samples of the near-end signal y(n). At an inactive-to-active transition of the v_flg control signal (a transition from v_flg=0 to v_flg=1), the timing controller 9 starts counting at the sampling rate and asserts the KEEP signal until the sample count reaches a predetermined value denoted LENGTH, regardless of further changes of the far-end input signal between the active and silent states. A typical value of the LENGTH parameter is 38,400 samples. These samples may include both active-state data and silent-state data. The samples are stored as processable signals; the samples stored in one interval while the KEEP signal is asserted constitute a data vector.

Figures 4A, 4B:
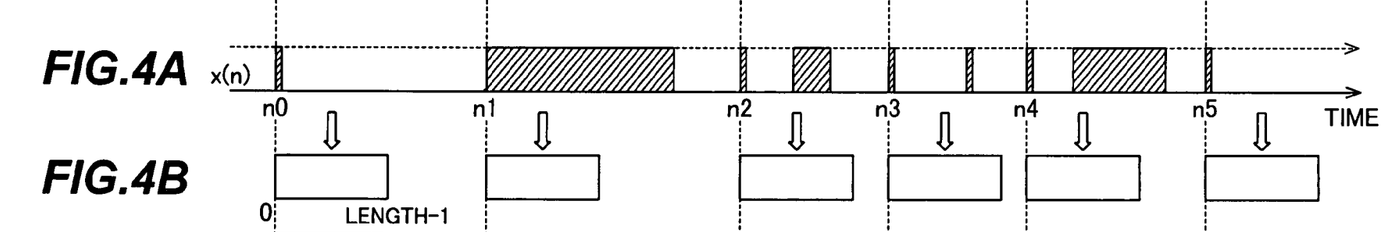
FIGS. 4A to 4F are timing diagrams illustrating the operation of the gated data registers in the first embodiment.

FIG. 4A schematically illustrates exemplary intervals in which the far-end input signal x(n) is active (the hatched intervals) and silent. The voice detector 8 asserts the v_flg control signal (v_flg=1) during the hatched intervals.

FIG. 4B shows the corresponding sampling windows, that is, the intervals during which the timing controller 9 asserts the KEEP signal and samples of the far-end signal are collected. Once a sampling window opens at the timing of a transition from v_flg=0 to v_flg=1, the window remains open for the predetermined length (LENGTH), regardless of further transitions of the v_flg control signal. If the timing controller 9 starts counting at zero during the interval, the sample count of the last sample reaches a value (LENGTH−1).

Figure 4C:
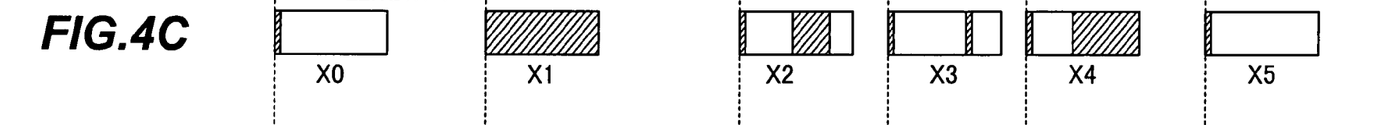

FIG. 4C schematically illustrates six exemplary data vectors X0 to X5 expressed by the following equation (7), which are generated from the collected samples of the far-end signal under control of the timing controller 9.

$$\left.\begin{array}{l} X0 = [x(n0), \ldots, x(n0 + \text{LENGTH} - 1)] \\ X1 = [x(n1), \ldots, x(n1 + \text{LENGTH} - 1)] \\ X2 = [x(n2), \ldots, x(n2 + \text{LENGTH} - 1)] \\ X3 = [x(n3), \ldots, x(n3 + \text{LENGTH} - 1)] \\ X4 = [x(n4), \ldots, x(n4 + \text{LENGTH} - 1)] \\ X5 = [x(n5), \ldots, x(n5 + \text{LENGTH} - 1)] \end{array}\right\} \quad (7)$$

In FIGS. 4A and 4C, for simplicity, the far-end input signal X(n) is shown as having a constant fixed amplitude during the hatched intervals. Six is the maximum number of data vectors that can be stored at once in this embodiment, although the invention is not limited to this particular number. The maximum number will be denoted FULL_PILE. As described below, the number of data vectors actually used may be less than FULL_PILE.

During these sampling windows, while the timing controller 9 asserts the KEEP signal, gated data register 11s also collects and stores samples y(n) of the near-end signal received from the sending input terminal Sin 5. Accordingly, this sampling also starts at timings controlled by the v_flg control signal output by the voice detector 8 on the basis of activity at the receiving input terminal Rin 1. As noted above, the echo y(n) includes a delay (d) representing the temporal length of the echo path.

Figure 4D:
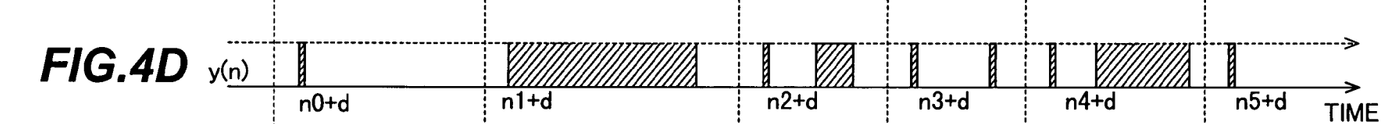
Figure 4E:
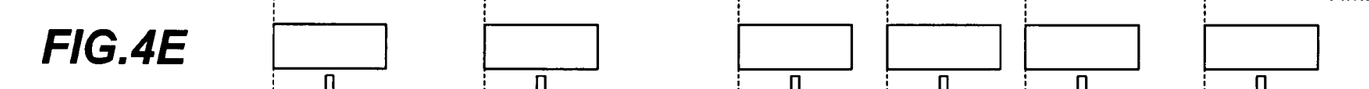
Figure 4F:
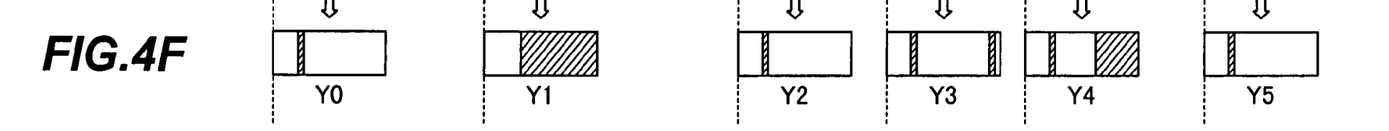

FIG. 4D schematically illustrates exemplary intervals in which the echo y(n) is active (the hatched intervals) and silent. FIG. 4E shows the corresponding sampling windows, during which gated data register 11s collects samples y(n) of the echo of the far-end input signal in FIG. 4A, delayed by the echo path and picked up by the microphone 4, and generates the data vectors Y0 to Y5 shown in FIG. 4F. The sampling windows in FIG. 4E are the intervals during which the timing controller 9 asserts the KEEP signal, and are identical to the sampling windows in FIG. 4B. The data vectors can be expressed by the following equation (8).

$$\left.\begin{array}{l} Y0 = [y(n0), \ldots, y(n0 + \text{LENGTH} - 1)] \\ Y1 = [y(n1), \ldots, y(n1 + \text{LENGTH} - 1)] \\ Y2 = [y(n2), \ldots, y(n2 + \text{LENGTH} - 1)] \\ Y3 = [y(n3), \ldots, y(n3 + \text{LENGTH} - 1)] \\ Y4 = [y(n4), \ldots, y(n4 + \text{LENGTH} - 1)] \\ Y5 = [y(n5), \ldots, y(n5 + \text{LENGTH} - 1)] \end{array}\right\} \quad (8)$$

As the gated data registers 11s, 11r continue to collect samples and store data vectors, when the predetermined maximum number of data vectors have been stored, further data vectors are cyclically overwritten onto the stored data vectors. In this embodiment, for example, since the predetermined maximum number of data vectors is six, when data vectors X(5) and Y(5), also denoted X5 and Y5, have been stored, the next pair of data vectors, expressed by the following equation (9)

$$X6 = [x(n6), \ldots, x(n6 + \text{LENGTH} - 1)]$$

$$Y6 = [y(n6), \ldots, y(n6 + \text{LENGTH} - 1)] \quad (9)$$

are overwritten on the first pair of data vectors, expressed by the following equation (10)

$$X0 = [x(n0), \ldots, x(n0 + \text{LENGTH} - 1)]$$

$$Y0 = [y(n0), \ldots, y(n0 + \text{LENGTH} - 1)] \quad (10)$$

and storage proceeds thereafter as in a ring buffer.

Received data vector processor 12r receives data vectors X(n) from gated data register 11r and data vector processor 12s receives data vectors Y(n) from gated data register 11s. Each time a new data vector has been assembled, the gated data registers 11r, 11s send respective timing signals (keep_flg_on_to_off=1) to the data vector processors 12r, 12s. At other times, the timing signals are left in the inactive state (keep_flg_on_to_off=0). Since gated data registers 11r and 11s output the keep_flag_on_to_off timing signal at identical timings, one of gated data register 11r and gated data register 11s (for example, gated data register 11r) may supply the keep_flag_on_to_off timing signal to both data vector processors 12r and 12s.

The data vector processors 12r, 12s generate four simulated input signals, referred to below as input vectors steals_rin_add, steals_rin_sub, steals_sin_add, and steals_sin_sub, from the most recently received data vectors by performing arithmetic operations on data in corresponding positions in the data vectors. Since each data vector begins at a timing when the voice detector 8 detects a transition from the silent state (v_flg=0) to the active state (v_flg=1), the arithmetic operations are synchronized with respect to these timings.

As will be explained below, adequate echo canceling performance is sometimes not obtained by synchronized processing of the received data vectors. The first embodiment therefore includes the self-cancellation detector 18.

The operation of the vector processors 12*r*, 12*s*, and the self-cancellation detector 18 will now be described.

Since the operation of data vector processor 12*s* differs from the operation of data vector processor 12*r* only in that it receives data vectors Y(n) representing the echo instead of data vectors X(n) representing the far-end input signal, only the operation of data vector processor 12*r* will be described below.

Data vector processor 12*r* processes the pile_cnt most recently received data vectors to generate the input vectors steals_rin_add, steals_rin_sub for input to the self-cancellation detector 18. pile_cnt is initially one and is always equal to or less than the maximum number FULL_PILE ($1 \leq$ pile_cnt $\leq$ FULL_PILE). The number pile_cnt is used as a divisor for calculating averages, as described below. In this embodiment (FULL_PILE=6), once six data vectors X(0) to X(5) have been stored, data vector processor 12*r* may use up to six data vectors, but before that time, data vector processor 12*r* necessarily uses fewer than six data vectors. The incrementing of the parameter pile_cnt will be described below.

The self-cancellation detector 18 decides whether synchronized averaging of the signal waveforms would or would not be effective. The decision process will be explained below.

Like the echo canceler in Japanese Patent Application No. 2007-288404, the echo canceler 100 in the first embodiment attempts to generate tap coefficients that improve echo cancellation performance even in the silent state by synchronized averaging of the data vectors of samples of the reference signal (far-end input signal) and the near-end signal, to reduce the ratio of near-end noise to the reference signal. Sometimes, however, synchronized averaging of the speech signal vectors reduces desired components even more than noise, due to the periodicity of speech signals.

Figure 5:
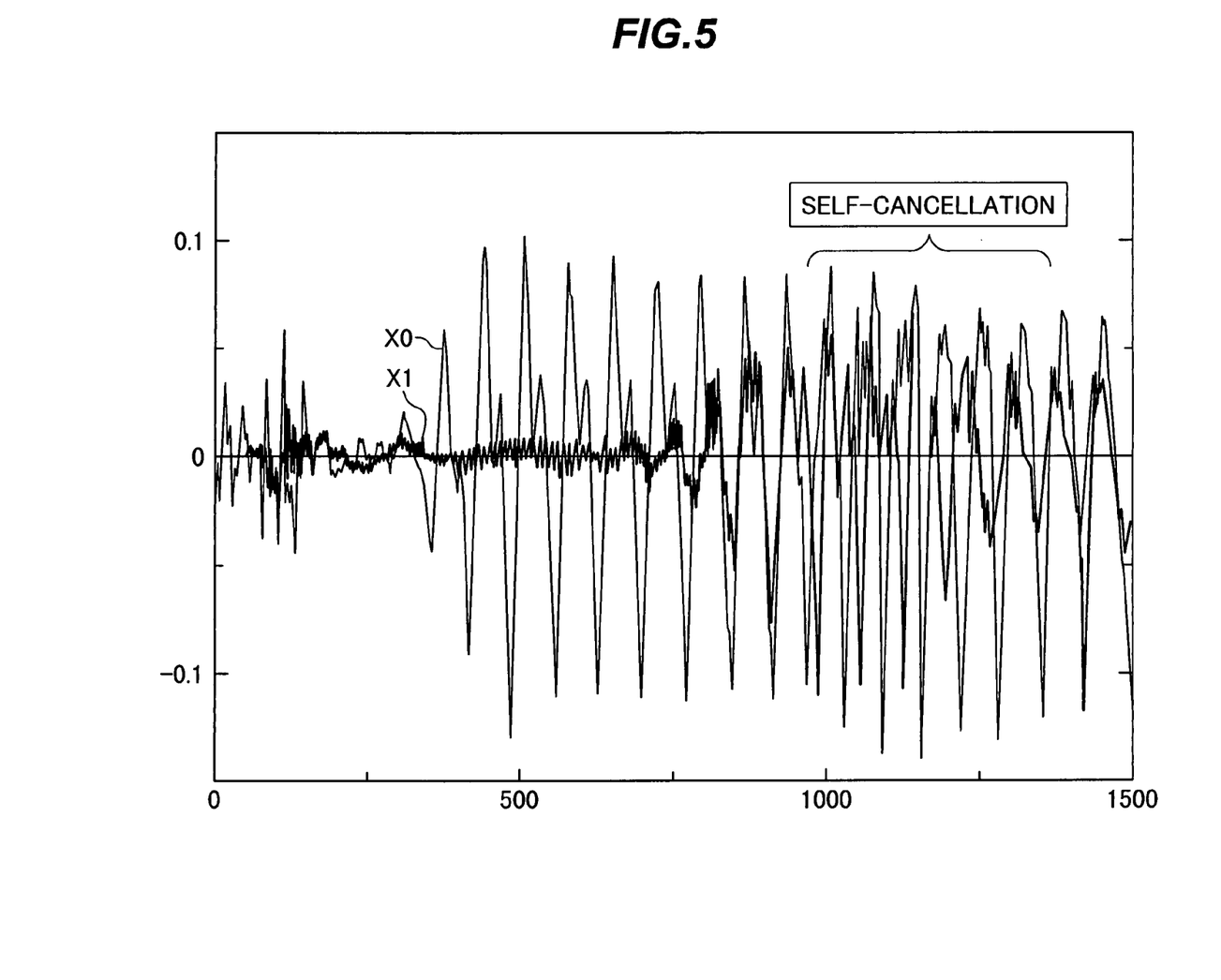
FIG. 5 is a waveform diagram illustrating two signals having components that would cancel out if additively combined.

The waveforms in FIG. 5, representing two reference vectors X0 and X1, illustrate this phenomenon. The sample number is indicated on the horizontal axis. Signal amplitude is indicated on the vertical axis. From about the 1000th sample to about the 1300th sample, the waveforms of the data vectors X0 and X1 show similar periodicity but tend to have opposite signs. If the data vectors X0 and X1 were averaged, in this part of their waveforms they would tend to cancel each other out and the averaged signal would not be an effective simulated input signal from which to generate an echo replica signal. Use of the synchronously averaged reference signal could lead to degraded echo cancellation performance.

To avoid this, the self-cancellation detector 18 determines whether the reference signal vectors would cancel out if averaged, and changes the input to the silent adaptive filter 16 accordingly.

Referring to FIG. 3, for simplicity, the operation of the self-cancellation detector 18 will be described for a case in which only the first two data vectors X0, X1 expressed by equation (7) and the first two data vectors Y0, Y1 expressed by equation (8) are stored in the gated data registers 11*r*, 11*s*.

Data vector processor 12*r* generates an input vector steals_rin_add by adding data vectors X0, X1 as in equation (11) and an input vector steals_rin_sub by subtracting data vector X1 from data vector X0 as in equation (12). The data vector processor 12*s* generates an input vector steals_sin_add by adding data vectors Y0, Y1 as in equation (13) and an input vector steals_sin_sub by subtracting data vector Y1 from data vector Y0 as in equation (14).

$$\text{steals\_rin\_add} = X0 + X1 = [\text{rin\_keep\_add}[0], \ldots, \text{rin\_keep\_add}[\text{LENGTH}-1]] \quad (11)$$

$$\text{steals\_rin\_add} = X0 - X1 = [\text{rin\_keep\_sub}[0], \ldots, \text{rin\_keep\_sub}[\text{LENGTH}-1]] \quad (12)$$

$$\text{steals\_sin\_add} = Y0 + Y1 = [\text{sin\_keep\_add}[0], \ldots, \text{sin\_keep\_add}[\text{LENGTH}-1]] \quad (13)$$

$$\text{steals\_sin\_add} = Y0 - Y1 = [\text{sin\_keep\_sub}[0], \ldots, \text{sin\_keep\_sub}[\text{LENGTH}-1]] \quad (14)$$

The self-cancellation detector 18 receives data vectors X0, X1 and input vectors steals_rin_add, steals_rin_sub from data vector processor 12*r*, and data vectors Y0, Y1 and input vectors steals_sin_add, steals_sin_sub from data vector processor 12*s*.

From data vectors X0, X1, the additive reference power calculator 18_1 in the self-cancellation detector 18 calculates power values abs_rin_plane as in equation (15) and p_steals_rin_add as in equation (16) and the subtractive reference power calculator 18_2 calculates a power value p_steals_rin_sub as in equation (17). These three power values are sent to the power ratio calculator 18_3 and the signal selector 18_5. The expressions |X0|, |X1|, |X0+X1|, and |X0−X1| in equations (15), (16), (17) indicate the vector magnitudes of vectors X0, X1, (X0+X1), and (X0−X1).

$$\text{abs\_rin\_plane} = |X0| + |X1| \quad (15)$$

$$p\_\text{steals\_rin\_add} = |X0 + X1| \quad (16)$$

$$p\_\text{steals\_rin\_sub} = |X0 - X1| \quad (17)$$

From the data vectors Y0, Y1 received from the data vector processor 12*s*, the additive echo power calculator 18_7 calculates a power value p_steals_sin_add as in equation (18) and the subtractive echo power calculator 18_7 calculates a power value p_steals_sin_sub as in equation (19). These two power values are sent to the power ratio calculator 18_3 and the signal selector 18_5.

$$p\_\text{steals\_sin\_add} = |Y0 + Y1| \quad (18)$$

$$p\_\text{steals\_sin\_sub} = |Y0 - Y1| \quad (19)$$

The power ratio calculator 18_3 also sends the signal selector 18_5 a use_data signal. When the use_data signal is active (use_data=1), the signal selector 18_5 updates the data vector steals_rin stored in the simulated data register 13*r* and the data vector steals_sin stored in the simulated data register 13*s* according to two conditions described below. When the use_data signal is inactive (use_data=0), the signal selector 18_5 does not update the data vector steals_rin stored in the simulated data register 13*r* and the data vector steals_sin stored in the simulated data register 13*s*.

The first condition (condition 1) is a provisional condition for deciding whether the synchronized adding of data vector X1 to data vector X0 would be effective. The final decision is made by the power ratio calculator 18_3. The first condition, expressed as condition (20) below, is that the sum of the magnitudes of data vectors X0 and X1 (abs_rin_plane) is equal to or less than the magnitude of the vector sum of data vectors X0 and X1 (p_steals_rin_add). Alternatively, a modified condition (20') may be used by adding a margin γ to the magnitude of the sum (p_steals_rin_add).

Condition 1:

$$\text{abs\_rin\_plane} \leq p\_\text{steals\_rin\_add} \quad (20)$$

$$\text{abs\_rin\_plane} \leq p\_\text{steals\_rin\_add} + \gamma \quad (20')$$

If the modified condition (20') is used, the value of the margin γ is a design choice. One possible choice is one ten-thousandth of abs_rin_plane (γ=0.001×abs_rin_plane).

If the first condition (20 or 20') is satisfied, the signal selector 18_5 provisionally decides that steals_rin_add, the synchronous sum of data vectors X0 and X1, may be stored in the simulated data register 13*r* as data vector steals_rin and that steals_sin_add, the synchronous sum of data vectors Y0 and Y1, may be stored in the simulated data register 13*s* as data vector steals_sin, sends these two data vectors steals_rin_add and steals_sin_add to the power ratio calculator 18_3, and increments the count parameter pile_cnt by one.

If the first condition (20 or 20') is not satisfied, the signal selector 18_5 decides whether a second condition is satisfied.

The second condition (condition 2) is a provisional condition for deciding whether the synchronized subtraction of data vector X1 from data vector X0 would be effective. The second condition, expressed as condition (21) below, is that the sum of the magnitudes of data vectors X0 and X1 (abs_rin_plane) is equal to or less than the magnitude of the difference between data vectors X0 and X1 (p_steals_rin_sub). Alternatively, a modified condition (21') may be used by adding a margin γ' to the magnitude of the difference (p_steals_rin_sub).

Condition 2:

$$\text{abs\_rin\_plane} \leq p\_\text{steals\_rin\_sub} \quad (21)$$

$$\text{abs\_rin\_plane} \leq p\_\text{steals\_rin\_sub} + \gamma' \quad (21')$$

If the modified condition (21') is used, the value of the margin γ' is a design choice. One possible choice for γ' is 0.001×abs_rin_plane. The two margins γ and γ' may have the same value or different values.

If the second condition (21 or 21') is satisfied, the signal selector 18_5 provisionally decides that steals_rin_sub, the synchronous difference of data vectors X0 and X1, may be stored in the simulated data register 13*r* as steals_rin and that steals_sin_sub, the synchronous difference of data vectors Y0 and Y1, may be stored in the simulated data register 13*s* as steals_sin, sends these two vectors steals_rin_sub and steals_sin_sub to the power ratio calculator 18_3, and increments the count parameter pile_cnt by one.

If neither the first condition nor the second condition is satisfied, the signal selector 18_5 does not update the data vector steals_rin stored in the simulated data register 13*r* and the data vector steals_sin stored in the simulated data register 13*s*, does not increment the count parameter pile_cnt, and supplies the data vectors X(n), Y(n) stored in the signal selector 18_5 as the provisionally determined data vectors steals_rin, steals_sin to the power ratio calculator 18_3.

When the signal selector 18_5 first attempts to determine whether the second condition is satisfied, the count parameter pile_cnt has its initial value of one (pile_cnt=1) and only data vectors X0 and Y0 are available, so the power ratio calculator 18_3 receives these data vectors X0, Y0 as steals_rin and steals_sin. When pile_cnt is equal to two, even though vectors X0 and X1 are available and vectors Y0 and Y1 are available, if neither the first condition nor the second condition is satisfied, the power ratio calculator 18_3 again stores data vectors X0 and Y0 as steals_rin and steals_sin.

The power ratio calculator 18_3 uses the provisionally determined data vectors steals_rin, steals_sin received from the signal selector 18_5 to calculate a scalar quotient vevtor_sn expressed by the following equation (22).

$$\text{vevtor\_}sn = |\text{steals\_rin}| / |\text{steals\_sin}| \quad (22)$$

The scalar quantity vevtor_sn is used as an index for evaluating the effectiveness of synchronous addition and subtraction. Initially, vevtor_sn is set to an appropriate value such as zero. The power ratio calculator 18_3 compares the newly calculated value of vevtor_sn with the previous value of vevtor_sn, calculated the previous time new simulated data vectors were stored, which is retained in the power ratio calculator 18_3. If the new value of vevtor_sn is greater than the previous value, the power ratio calculator 18_3 asserts the use_data signal (use_data=1) to indicate that synchronous addition or subtraction would be effective. If the new value of vevtor_sn is equal to or less than the previous value, the power ratio calculator 18_3 deactivates the use_data signal (use_data=0) to indicate that synchronous addition or subtraction would be ineffective.

When the use_data signal is asserted (use_data=1), the signal selector 18_5 divides the newly generated (provisionally determined) data vectors steals_rin and steals_sin by the count parameter pile_cnt and stores the resulting quotients, also indicated as steals_rin and steals_sin in FIG. 3, in the simulated data registers 13*r*, 13*s*. When the use_data signal is inactive (use_data=0), the signal selector 18_5 does not perform any division operations and does not update the data vectors steals_rin and steals_sin stored in the simulated data registers 13*r*, 13*s*. The old data vectors steals_rin and steals_sin may be retained in the simulated data registers 13*r*, 13*s* by not writing the provisionally determined data vectors steals_rin and steals_sin into the simulated data registers 13*r*, 13*s*, or by saving the old vectors steals_rin and steals_sin, writing the provisionally determined vectors steals_rin and steals_sin into the simulated data registers 13*r*, 13*s*, and writing the saved old vectors steals_rin and steals_sin back into the simulated data registers 13*r*, 13*s* when the signal selector 18_5 finally decides not to use the provisionally determined vectors steals_rin and steals_sin. At the start of the operation, the data vectors steals_rin and steals_sin have initial values of zero (steals_rin=0, steals_sin=0). The next time, data vectors X0 and Y0 are retained as steals_rin and steals_sin in the simulated data registers 13*r*, 13*s*.

The individual elements of the data vectors steals_rin and steals_sin finally selected by the signal selector 18_5 for storage in the simulated data registers 13*r* and 13*s* can be expressed as in the following equations (23) and (24).

$$\text{steals\_rin} = [\text{rin\_keep}[0], \ldots, \text{rin\_keep}[\text{LENGTH}-1]] \quad (23)$$

$$\text{steals\_sin} = [\text{sin\_keep}[0], \ldots, \text{sin\_keep}[\text{LENGTH}-1]] \quad (24)$$

The reason for simultaneously calculating both steals_rin_add and steals_sin_add, and both steals_rin_sub and steals_sin_sub, when deciding what data vectors to store as steals_rin and steals_sin in the simulated data registers 13*r* and 13*s* is that when the waveforms of the data vectors X1 and X0 received in the gated data register 11*r* have generally opposite signs, rendering synchronous addition ineffective, synchronous subtraction can be used to obtain the same effect as would normally be obtained by synchronous addition.

The operation of the data vector processors 12*r*, 12*s* and the self-cancellation detector 18 has been described for the case in which only data vectors X0, X1, Y0, and Y1 are used. If a third pair of data vectors X2, Y2 is also used, the operation may be carried out, for example, as follows. When the third data vectors X2 and Y2 are selected, the values of vevtor_sn, steals_rin, and steals_sin calculated from data vectors X0, X1 and Y0, Y1 are retained. New values of vevtor_sn, steals_rin, and steals_sin are calculated in the same way as described above for the case of two data vectors, except that the retained steals_rin vector is used in place of X0, the retained steals_sin vector is used in place of Y0, and the new data vectors X2 and Y2 are used in place of X1 and Y1.

The same procedure can be used again when the next pair of data vectors X3, Y3 is selected, by using these data vectors and the retained values of steals_rin and steals_sin. Repeated use of this procedure may continue even after the number of vectors reaches the maximum number (FULL_PILE). When this procedure is used the count parameter pile_cnt has a maximum value of two.

An exemplary method that evaluates the effectiveness of synchronous addition or subtraction to decide which data vectors to store as steals_rin and steals_sin in the simulated data registers 13r and 13s has been described above, but other methods are also contemplated.

For example, the simulated signal vectors steals_rin and steals_sin for storage in the simulated data registers 13r and 13s may be finally decided by testing all combinations of addition and subtraction of all the stored data vectors and comparing the results with the previous value of vevtor_sn. To simplify the description of this method, it will be assumed that data vectors X1 to X3 are stored in gated data register 11r. The magnitudes of the vectors (X1+X2+X3), (−X1+X2+X3), (X1−X2+X3), (X1+X2−X3), (−X1−X2+X3), (−X1+X2−X3), (X1−X2−X3), and (−X1−X2−X3) obtained by performing eight different combinations of synchronous addition and subtraction are calculated, the vector with the maximum vector magnitude is provisionally taken as steals_rin for storage in the simulated data register 13r, the corresponding provisional steals_sin is calculated, a new vevtor_sn value is calculated from the provisional steals_rin and steals_sin values, and the newly calculated vevtor_sn value is compared with the previous vevtor_sn value. If the new vevtor_sn value is greater than the previous value, the provisionally determined data vectors are finalized as steals_rin and steals_sin and stored in the simulated data registers 13r and 13s and the previous value of vevtor_sn is updated to the new vevtor_sn value. If this method of determining the effectiveness of synchronous addition and subtraction is used, then when synchronous addition and subtraction is found to be effective, the count parameter pile_cnt always has the maximum value. In the example described above, since combinations of three data vectors are tested by synchronous addition and subtraction, the value of the count parameter pile_cnt is three.

An alternative method is to test various pairs of stored data vectors, calculate their synchronous sums and differences, and select the sum or difference that produces the greatest improvement in the value of vevtor_sn. More generally, the combinations of synchronously added and/or subtracted data vectors tested may be combinations of any fixed number of data vectors selected from the stored data vectors; the number need not be limited to two.

Still more generally, the number of data vectors in each tested combination need not be a fixed number selected by the circuit designer; the number may be varied automatically according to ambient near-end noise. For example, the ambient near-end noise power may be calculated when neither the near-end party nor the far-end party is talking, the echo power may be calculated when only the far-end party is talking, and the number of data vectors per combination may be decided from the average ambient near-end noise power and the average echo power. The number of data vectors per combination may be decided by preparing a table that assigns a predetermined number for each combination of average ambient near-end noise power and average echo power by dividing the average ambient near-end noise power and average echo power into respective ranges and assigning a different number for each combination of ranges.

If sufficient computational hardware resources are available and the bit length of the signal values includes a margin of extra bits, the signal selector 18_5 may store the provisionally determined steals_rin and steals_sin values in the simulated data registers 13r, 13s directly, without dividing them by the count parameter pile_cnt.

The data vector stored as steals_sin in simulated data register 13s and the data vector stored as steals_rin in the simulated data register 13r are generated in the same way from the data vectors stored as processable signals in the gated data registers 11r, 11s.

Figure 6:
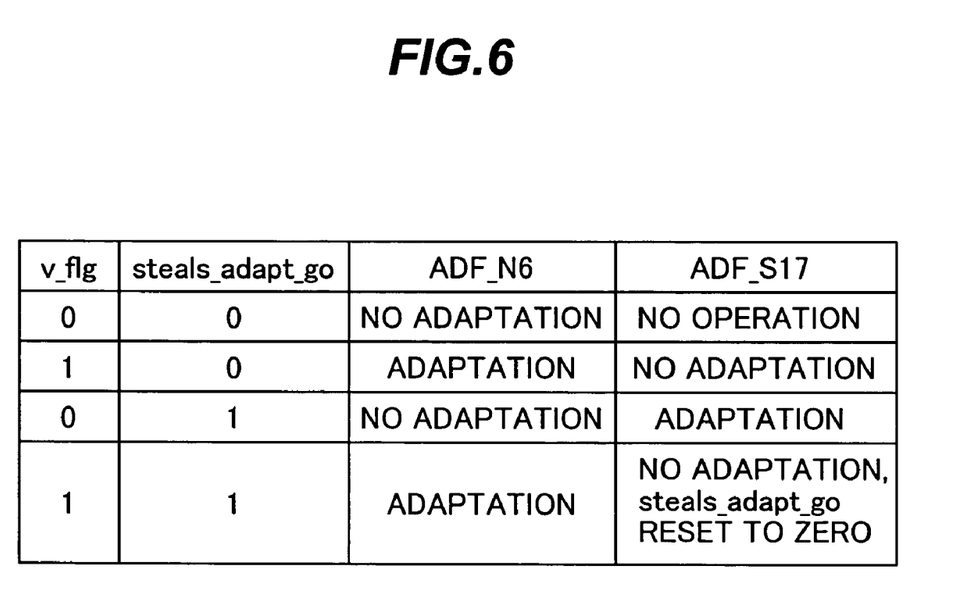
FIG. 6 is a table illustrating mode control in the first embodiment.

Each time data vector processor 12r stores a newly generated data vector steals_rin in simulated data register 13r, it also asserts the steals_adapt_go control signal (steals_adapt_go=1), indicating to the adaptive mode controller 10 that preparations for updating the tap coefficients in the silent adaptive filter section 17 are complete. The adaptive mode controller 10 controls the adaptation mode according to the steals_adapt_go control signal and the v_flg control signal as shown in FIG. 6.

Whenever the steals_adapt_go or the v_flg control signal is active, either the normal adaptive filter 6 or the silent adaptive filter section 17 carries out adaptation operations. To avoid having the normal adaptive filter 6 and the silent adaptive filter section 17 carry out adaptation operations simultaneously, the normal adaptive filter 6 carries out adaptation operations when the voice detector 8 detects the active state (v_flg=1), and the silent adaptive filter section 17 carries out adaptation operations when the voice detector 8 detects the silent state (v_flg=0) and the steals_adapt_go control signal is active (steals_adapt_go=1). When both control signals are inactive (steals_adapt_go=0 and v_flg=0), neither the normal adaptive filter 6 nor the silent adaptive filter section 17 carries out adaptation operations.

Next, the operation of updating tap coefficients in the silent adaptive filter 16 in the silent adaptive filter section 17 will be described.

Referring to FIG. 2, the silent adaptive filter adapter 16d updates tap coefficients (not shown) in the coefficient register 16a. Data register 16c receives the elements rin_keep[k] one by one from the simulated data register 13r. In this embodiment, the initial values in data register 16c are all zero: data register 16c is reset to all zeros at each 0-to-1 transition of the steals_adp_go control signal from the adaptive mode controller 10.

Coefficient register 16a in the silent adaptive filter section 17 stores N tap coefficients, the same as the number of tap coefficients stored in coefficient register 14a in the normal adaptive filter 6. The tap coefficients stored in coefficient register 16a can be represented by a vector W(m) expressed by the following equation (25). The letter m indicates the sample number. Coefficient register 16a resets W(m) to the zero vector at the start of operation and continues to update the coefficients thereafter without resetting W(m) again.

$$W(m)=[w(0),w(1),\ldots,w(N-1)]^t \quad (25)$$

The elements rin_keep[m] of the averaged vector steals_rin stored in the simulated data register 13r, from rin_keep[0] to rin_keep[LENGTH−1], are shifted one by one into data register 16c. Data register 16c stores N of these elements as a simulated far-end data vector SX(m) expressed by the following equation (26). When the sample number is equal to zero (m=0), since data register 16c has received only a single element rin_keep[0], the stored sample vector SX(0) is expressed by the equation (27) below.

$$SX(m)=[Sx(m),Sx(m-1),\ldots,Sx(m-N+1)]^t \quad (26)$$

$$SX(0)=[\text{rin\_keep}[0],0,\ldots,0]^t \quad (27)$$

Convolver 16b convolves the data vector SX(m) in equation (26) with the vector W(m) in equation (25), by multiplying the data values by the corresponding coefficient values and summing the results, thereby generates a simulated echo replica signal Sy'(m) internal to the silent adaptive filter section 17, and sends the simulated echo replica signal Sy'(m) to the subtractor 31. The simulated echo replica signal Sy'(m) is expressed by the following equation (28).

$$Sy'(m)=W^t(m)SX(m)) \quad (28)$$

The subtractor 31 receives the element sin_keep[m] of the averaged vector steals_sin from the simulated data register 13s at the same timing as the timing at which simulated data register 13r supplies the element rin_keep[m] of the averaged vector steals_rin, and subtracts the simulated echo replica signal Sy'(m) to generate a simulated residual signal Se(m), which is sent to the silent adaptive filter adapter 16d. The silent adaptive filter adapter 16d updates the coefficient vector W(m) to a vector W(m+1) expressed by the following equation (29).

$$W(m+1) = W(m) + \alpha \frac{SX(m)SE(m)}{\sum_{i=0}^{N-1} Sx^2(m-i)} \quad (29)$$

A further explanation of the updating of tap coefficients will now be given. In the first embodiment, even while the normal adaptive filter 6 is operating, it halts adaptation operations when the double-talk detector (not shown) detects that the near-end party and the far-end party are speaking or only the near-end party is speaking. Specifically, the update stopper 16e stores the sample numbers of data samples collected when the double-talk detector detects that the near-end party is speaking; at timings at which these sampled data and the simulated signal data overlap, the STP signal from the 16e is asserted and the silent adaptive filter adapter 16d halts the updating of the tap coefficients. It is common knowledge that if an echo canceler continues to update its tap coefficients when the near-end party is speaking, echo cancellation performance is degraded. Even though the silent adaptive filter section 17 uses the simulated data steals_sin stored in the simulated data register 13s, it respects this common knowledge and halts adaptation during periods in which the simulated data were derived from samples obtained when the near-end party was speaking. These periods are controlled by the update stopper 16e in units of one sample interval; the duration of a period during which the adaptation operation in the silent adaptive filter section 17 is halted may be an arbitrary integer multiple of the sampling period. Halting adaptation during these periods prevents disturbances in the filter coefficients in the silent adaptive filter section 17 from being passed on to the normal adaptive filter 6.

The double-talk state may be detected by applying known methods. The double-talk detector only has to detect the echo component and the near-end signal, and the states of the far-end voice signal and the near-end voice signal.

The coefficient vector W(m) updated by the silent adaptive filter adapter 16d for storage in the coefficient register 16a is sent to switch 32 (FIG. 1). When the silent adaptive filter section 17 is operating, because the v_flg control signal is inactive, switch 32 is connected to terminal_a, so the updated coefficient vector W(m) is sent to the coefficient register 14a through switch 32, and is overwritten on the coefficient vector H(m) stored in the normal adaptive filter 6, as expressed by the following equation (30).

$$H(m)=W(m) \quad (30)$$

When the active state of the far-end signal is next detected, the adaptive mode controller 10 selects terminal_b in switch 32 so that when the normal adaptive filter 6 is restarted, the most recent values of coefficient vector W(m) are used as the initial values of coefficient vector H(m).

When the far-end input signal is active, the normal adaptive filter 6 adapts, converges, and reduces the echo component. Simultaneously, the silent adaptive filter section 17 stores data vectors including samples of the far-end and near-end input signals and prepares to continue the adaptation process in the silent state. In the silent state, while the normal adaptive filter 6 is halted, the silent adaptive filter section 17 simulates the adaptation process in the normal adaptive filter 6, using simulated input signals, to generate tap coefficients that continue to converge.

The simulated input signals are obtained by averaging two or more of the data vectors collected by the gated data registers 11r, 11s, but the averaging process is monitored to decide how it could best be carried out. If additive synchronized averaging of the samples of the far-end input signal would cause them to cancel out due to the voice periodicity, subtractive synchronized averaging is used instead, or a combination of additive and subtractive averaging may be used. If the additive and subtractive processes both prove ineffective, then the averaging results are not used and the simulated input signals used previously are retained. The decision and averaging process is carried out by simple calculations that impose almost no additional computational load, and do not require any settings to be made by the user.

When the active state resumes, these tap coefficients provide a starting point from which the normal adaptive filter 6 can adapt and converge quickly, using a comparatively simple and stable algorithm that is immune to effects caused by data acquisition timing and averaging timing, without the need for computationally expensive high-speed algorithms of uncertain stability. The echo component is therefore removed rapidly and reliably without an increased computational load, and without sacrificing ease of use.

In a variation of the first embodiment, instead of the ratio of steals_rin to steals_sin, the difference between steals_rin and steals_sin is used as the evaluation vector vevtor_sn.

In another variation, instead of performing synchronous addition and subtraction simultaneously, synchronous addition and subtraction are performed in succession. For example, synchronous addition may be performed first to detect changes in power, and synchronous subtraction may be performed only when it is decided that synchronous addition leads to self-cancellation.

Second Embodiment

Figure 7:
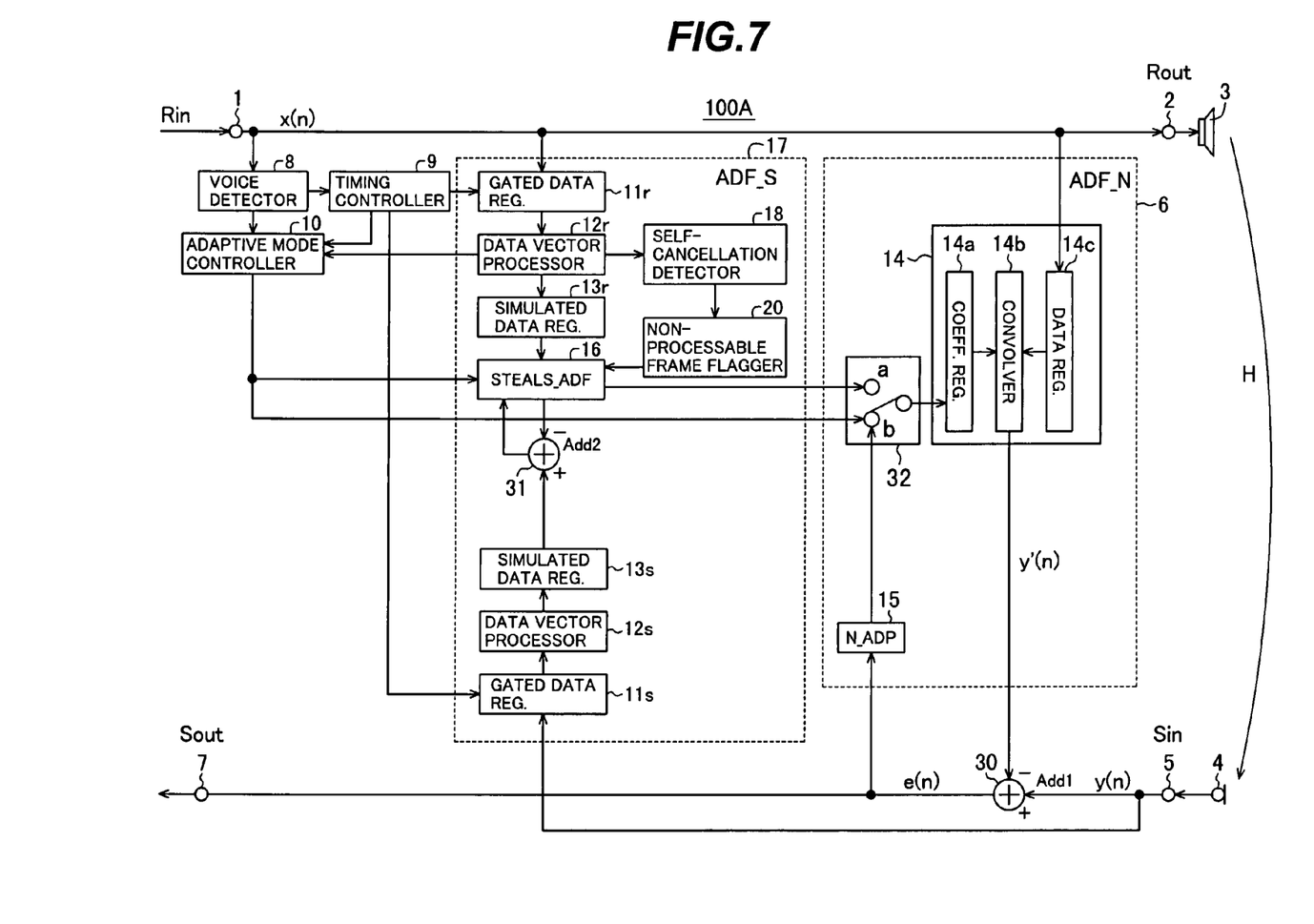
FIG. 7 is a block diagram illustrating an echo canceler according to a second embodiment.

Referring to the block diagram in FIG. 7, the differences between the echo canceler 100A in the second embodiment and the echo canceler 100 in the first embodiment are that the silent adaptive filter section 17 in the second embodiment includes a non-processable frame flagger 20 and modified vector processors 12r, 12s, modified simulated data registers 13r, 13s, a modified silent adaptive filter 16, and a modified self-cancellation detector 18. The following description of the operation of the echo canceler 100A will concentrate on the differences from the first embodiment.

In the second embodiment, data vector processor 12r calculates a synchronous sum or average of data vectors collected by gated data register 11r to generate a simulated received data vector, and data vector processor 12s calculates a synchronous sum or average of data vectors collected by the gated data register 11s to generate a simulated sending data vector, as in Japanese Patent Application No. 2007-288404. The simulated data registers 13r, 13s receive and store the simulated data vectors generated in the data vector processors 12r, 12s. The self-cancellation detector 18 receives the data vectors collected by gated data register 11r and the simulated data vectors generated by data vector processor 12r. Each time data vector processor 12r stores a simulated data vector in simulated data register 13r, it also asserts the steals_adapt_go control signal (steals_adapt_go=1), indicating to the adaptive mode controller 10 that preparations for updating the tap coefficients in the silent state are complete.

As in the first embodiment, the self-cancellation detector 18 decides whether synchronous addition or averaging would produce a self-canceling effect due to voice periodicity, but in the second embodiment, the self-cancellation detector 18 makes this decision for one frame at a time, where a frame is only one part of the simulated received far-end data vector. The frame length is an integral submultiple (for example, a twentieth) of the data vector length. Successive frames may be non-overlapping, or each frame may overlap the next frame by, for example, half the frame length. The decision may be made by applying the first condition in the first embodiment, expressed as condition (20) in the first embodiment, although with a different number of samples. More specifically, the self-cancellation detector 18 decides whether the sum of the vector magnitudes of the parts of the data vectors corresponding to one frame is equal to or less than the vector magnitude of the part of the simulated data vector generated in data vector processor 12r corresponding to the same frame. If data vector processor 12r generates the simulated data vector by synchronized averaging, then in applying this condition, the self-cancellation detector 18 divides the sum of the magnitudes by the number of data vectors included in the average.

Self-cancellation is affected by minor shifts in the periodicity of the data vectors with respect to the timings at which the voice detector 8 detects transitions of the far-end signal to the active state. Accordingly, within the fixed data vector length, self-cancellation will normally occur in some frames but not in others. That is why the second embodiment tests the first condition on individual frames instead of entire data vectors.

The self-cancellation detector 18 sends the result of its decision for each frame to the non-processable frame flagger 20. The non-processable frame flagger 20 stores the results in frame sequence, and sends the results to the update stopper 16e (FIG. 2) in synchronization with the operation of updating tap coefficients in the silent adaptive filter 16.

When a frame in which the voice signal has cancelled itself out is about to be processed, the update stopper 16e asserts the STP signal and the silent adaptive filter adapter 16d halts the updating of the tap coefficients as in the first embodiment.

In other respects, the operation of the echo canceler 100A in the second embodiment is the same as in the first embodiment, so further descriptions will be omitted.

The second embodiment has substantially the same effect as the first embodiment, but is able to select data for use in updating of the tap coefficients stored in the silent adaptive filter 16 by considering smaller groups of samples than in the first embodiment, thereby increasing the number of opportunities for convergence. As a result, the second embodiment provides an echo canceler that converges more rapidly than the echo canceler in the first embodiment.

In a variation of the second embodiment, the decision as to whether self-cancellation would occur is made for individual samples; that is, the frame length is one sample.

The methods of the first and second embodiment may be combined. Data vectors may be prepared by both additive and subtractive operations as in the first embodiment, and the data vectors may be divided into frames as in the second embodiment. In each frame, the simulated data generated by additive operations are used unless the additive operations produce self-cancellation; if additive operations produce self-cancellation, then the simulated data produced by subtractive operations are used unless the subtractive operations also produce self-cancellation; if both additive and subtractive operations produce self-cancellation, the non-processable frame flagger 20 is informed and the frame is not processed.

The echo canceler in the present invention is applicable to speakerphones and other types of hands-free telephone sets or other telephone sets with acoustic echo problems, and may also be used to address line echo problems. The applicable telephone sets include conference phones and so-called softphones.

Those skilled in the art will recognize that further variations are possible within the scope of the invention, which is defined in the appended claims.

What is claimed is:

1. An echo canceler for removing an echo of a far-end input signal from a near-end input signal by adaptive filtering, the echo canceler comprising:

a voice detector for detecting an active state and a silent state of the far-end input signal;

a first adaptive filter for filtering the far-end input signal by using first coefficients and adapting the first coefficients according to the far-end input signal and the near-end input signal, the first coefficients being adapted only when the voice detector detects the active state;

a second adaptive filter for filtering a simulated far-end input signal by using second coefficients and adapting the second coefficients according to the simulated far-end input signal and a simulated near-end input signal, the second coefficients being adapted only when the voice detector detects the silent state;

a data selector for simultaneously sampling the far-end input signal and the near-end input signal over periods of a predetermined length, each of the periods including an interval in which the voice detector detects the active state, to generate a plurality of processable signals, each processable signal including a series of samples;

a simulated signal generator for generating the simulated far-end input signal and the simulated near-end input signal from the processable signals by combining samples in corresponding positions in different ones of the processable signals;

an adaptive mode controller for starting and stopping adaptation of the first and second coefficients in the first and second adaptive filters and, when starting the adaptation of the first coefficients after a period during which the second coefficients were adapted and the first coefficients were not adapted, using the second coefficients as initial values of the first coefficients; and a self-cancellation detector for deciding when self-cancellation has occurred by deciding whether combining the samples in the corresponding positions in the different ones of the processable signals has caused the combined samples to cancel each other out, and disabling use of at least parts of the simulated far-end signal and the simulated near-end signal for adaptation of the second coefficients in the second adaptive filter when self-cancellation has occurred.

2. The echo canceler of claim 1, wherein the self-cancellation detector decides whether self-cancellation has occurred according to a vector magnitude of at least one of the processable signals and a vector magnitude of the simulated far-end input signal.

3. The echo canceler of claim 2, wherein the self-cancellation detector also calculates a present ratio of the magnitude of the simulated far-end input signal to a magnitude of the simulated near-end input signal and a previous ratio of a magnitude of a previous simulated far-end input signal to a magnitude of a previous simulated near-end input signal, and disables use of the simulated far-end input signal and the simulated near-end input signal for adaptation of the second coefficients in the second adaptive filter when the present ratio is less than the previous ratio.

4. The echo canceler of claim 1, wherein the simulated signal generator combines a number of the processable signals equal to or less than a prescribed maximum number, the number of the processable signals combined being less than the prescribed maximum number when the number of the processable signals generated by the data selector has not yet reached the prescribed maximum number.

5. The echo canceler of claim 1, further comprising an update stopper for disabling use, for adaptation of the second coefficients in the second adaptive filter, of parts of the simulated far-end input signal and the simulated near-end input signal generated from parts of the processable signals including samples of double-talk.

6. The echo canceler of claim 1, wherein the self-cancellation detector divides the simulated far-end signal into a plurality of intervals, decides whether self-cancellation has occurred in each one of the plurality of intervals, and disables use, for adaptation of the second coefficients in the second adaptive filter, of the intervals in which self-cancellation has occurred.

7. The echo canceler of claim 1, wherein the simulated signal generator generates the simulated far-end signal and the simulated near-end signal again by combining the samples in the corresponding positions by addition.

8. The echo canceler of claim 7, wherein if the self-cancellation detector decides that self-cancellation has occurred, the simulated signal generator generates the simulated far-end signal and the simulated near-end signal again by combining the samples in the corresponding positions by subtraction, and the self-cancellation detector again decides whether self-cancellation has occurred.

9. The echo canceler of claim 1, wherein by using both addition and subtraction operations to combine the samples in the corresponding positions in different ways, the simulated signal generator generates at least two different simulated far-end signals, the self-cancellation detector decides whether self-cancellation has occurred separately for the different simulated far-end signals, and the self-cancellation detector selects a simulated far-end signal for which self-cancellation has not occurred for use in adapting the second coefficients.

10. The echo canceler of claim 1, wherein as the data selector generates successive processable signals, the simulated signal generator generates successive simulated far-end signals by additively averaging the samples in a most recent processable signal with the samples in the corresponding positions in a preceding simulated far-end signal.

11. The echo canceler of claim 10, wherein if the self-cancellation detector decides that self-cancellation has occurred, the simulated signal generator generates the simulated far-end signal and the simulated near-end signal again by subtractively averaging the samples in the most recent processable signal with the samples in the corresponding positions in the preceding simulated far-end signal, and the self-cancellation detector again decides whether self-cancellation has occurred.

12. A method of removing an echo of a far-end input signal from a near-end input signal by adaptive filtering, the method comprising:
    detecting an active state and a silent state of the far-end input signal;
    filtering the far-end input signal by using first coefficients;
    adapting the first coefficients according to the far-end input signal and the near-end input signal, the first coefficients being adapted only when the active state is detected;
    filtering a simulated far-end input signal by using second coefficients;
    adapting the second coefficients according to the simulated far-end input signal and a simulated near-end input signal, the second coefficients being adapted only when the silent state is detected;
    simultaneously sampling the far-end input signal and the near-end input signal over periods of a predetermined length, each of the periods including an interval in which the active state is detected, to generate a plurality of processable signals, each processable signal including a series of samples;
    generating the simulated far-end input signal and the simulated near-end input signal from the processable signals by combining samples in corresponding positions in different ones of the processable signals;
    starting and stopping adaptation of the first and second coefficients;
    using the second coefficients as initial values of the first coefficients when starting the adaptation of the first coefficients after a period during which the second coefficients were adapted and the first coefficients were not adapted; and
    deciding when self-cancellation has occurred by deciding whether combining the samples in the corresponding positions in the different ones of the processable signals caused the combined samples to cancel each other out and disabling use of at least parts of the simulated far-end signal and the simulated near-end signal for adaptation of the second coefficients in the second adaptive filter when self-cancellation has occurred.

13. The method of claim 12, wherein combining the samples in the corresponding positions comprises adding the samples in the corresponding positions.

14. The method of claim 12, wherein combining the samples in the corresponding positions comprises adding and subtracting the samples in the corresponding positions.

15. The method of claim 12, wherein combining the samples in the corresponding positions comprises averaging the samples in the corresponding positions.

16. A non-transitory machine-readable tangible medium storing a program executable by a computing device to remove an echo of a far-end input signal from a near-end input signal by adaptive filtering, the program comprising instructions for:
    detecting an active state and a silent state of the far-end input signal;
    filtering the far-end input signal by using first coefficients;

adapting the first coefficients according to the far-end input signal and the near-end input signal, the first coefficients being adapted only when the active state is detected;

filtering a simulated far-end input signal by using second coefficients;

adapting the second coefficients according to the simulated far-end input signal and a simulated near-end input signal, the second coefficients being adapted only when the silent state is detected;

simultaneously sampling the far-end input signal and the near-end input signal over periods of a predetermined length, each of the periods including an interval in which the active state is detected, to generate a plurality of processable signals, each processable signal including a series of samples;

generating the simulated far-end input signal and the simulated near-end input signal from the processable signals by combining samples in corresponding positions in different ones of the processable signals;

starting and stopping adaptation of the first and second coefficients;

using the second coefficients as initial values of the first coefficients when starting the adaptation of the first coefficients after a period during which the second coefficients were adapted and the first coefficients were not adapted; and deciding when self-cancellation has occurred by deciding whether combining the samples in the corresponding positions in the different ones of the processable signals caused the combined samples to cancel each other out and disabling use of at least parts of the simulated far-end signal and the simulated near-end signal for adaptation of the second coefficients in the second adaptive filter when self-cancellation has occurred.

17. The non-transitory machine-readable tangible medium of claim 16, wherein combining the samples in the corresponding positions comprises adding the samples in the corresponding positions.

18. The non-transitory machine-readable tangible medium of claim 16, wherein combining the samples in the corresponding positions comprises adding and subtracting the samples in the corresponding positions.

19. The non-transitory machine-readable tangible medium of claim 16, wherein combining the samples in the corresponding positions comprises averaging the samples in the corresponding positions.

* * * * *